(12) United States Patent
Arai et al.

(10) Patent No.: US 8,263,216 B2
(45) Date of Patent: Sep. 11, 2012

(54) EPOXY RESIN COMPOSITION FOR FIBER-REINFORCED COMPOSITE MATERIAL, PREPREG, AND FIBER-REINFORCED COMPOSITE MATERIAL

(75) Inventors: Atsuhito Arai, Ehime (JP); Hiroaki Sakata, Ehime (JP); Kenichi Yoshioka, Ehime (JP); Hiroshi Taiko, Ehime (JP); Jiro Nakatani, Moriyama (JP); Kotaro Ono, Moriyama (JP); Michiya Ishikawa, Moriyama (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/260,082

(22) PCT Filed: Jan. 13, 2010

(86) PCT No.: PCT/JP2010/050256
§ 371 (c)(1),
(2), (4) Date: Sep. 23, 2011

(87) PCT Pub. No.: WO2010/109929
PCT Pub. Date: Sep. 30, 2010

(65) Prior Publication Data
US 2012/0035299 A1 Feb. 9, 2012

(30) Foreign Application Priority Data

Mar. 24, 2009 (JP) ................. 2009-071933

(51) Int. Cl.
*B32B 27/04* (2006.01)
*B32B 27/38* (2006.01)
*C08L 63/00* (2006.01)
*C08G 59/28* (2006.01)
*C08G 59/38* (2006.01)
*C08G 59/50* (2006.01)

(52) U.S. Cl. ............. 428/297.4; 428/413; 523/427; 523/428; 525/524; 525/525; 525/526; 525/527

(58) Field of Classification Search ............ 428/297.4, 428/413; 523/400, 427, 428; 525/523, 524, 525/525, 526, 527
See application file for complete search history.

(56) References Cited

U.S. PATENT DOCUMENTS

| | | | | |
|---|---|---|---|---|
| 4,107,128 A * | 8/1978 | Hosoi et al. | | 523/434 |
| 4,451,645 A | 5/1984 | Johncock | | |
| 5,028,478 A | 7/1991 | Odagiri et al. | | |
| 5,599,629 A * | 2/1997 | Gardner et al. | | 428/413 |
| 5,789,073 A | 8/1998 | Odagiri et al. | | |
| 2011/0040111 A1 * | 2/2011 | Ono et al. | | 549/514 |

FOREIGN PATENT DOCUMENTS

| | | |
|---|---|---|
| JP | 58-74674 A | 5/1983 |
| JP | 63-170427 A | 7/1988 |
| JP | 63-170428 A | 7/1988 |
| JP | 64-026651 A | 1/1989 |
| JP | 9-235397 A | 9/1997 |
| JP | 2001-031838 A | 2/2001 |
| JP | 2004-010878 A | 1/2004 |
| JP | 2005-298713 A | 10/2005 |
| JP | 2006-265458 A | 10/2006 |
| WO | WO 2010047244 A1 * | 4/2010 |

OTHER PUBLICATIONS

International Search report, PCT/JP2010/050256, Apr. 13, 2010.

* cited by examiner

*Primary Examiner* — Michael J Feely
(74) *Attorney, Agent, or Firm* — Birch, Stewart, Kolasch & Birch, LLP

(57) ABSTRACT

Disclosed is a fiber-reinforced composite material that is high in heat resistance and strength while being low in the content of volatile matter that volatilizes during curing. Also disclosed are an epoxy resin composition for production thereof, and a prepreg produced from the epoxy resin composition. Specifically the invention provides an epoxy resin composition comprising: [A] an epoxy resin comprising two or more ring structures each consisting of four or more members, and at least one amine type or ether type glycidyl group directly connected to the ring structures, [B] a tri- or more-functional epoxy resin, and [C] a curing agent, and also provides a prepreg produced by impregnating reinforcing fiber with the epoxy resin composition and a fiber-reinforced composite material produced by curing the prepreg.

13 Claims, No Drawings

EPOXY RESIN COMPOSITION FOR FIBER-REINFORCED COMPOSITE MATERIAL, PREPREG, AND FIBER-REINFORCED COMPOSITE MATERIAL

TECHNICAL FIELD

The invention relates to an epoxy resin composition for fiber reinforced composite material (hereinafter, sometimes referred to simply as epoxy resin composition), prepreg, and fiber composite material. More specifically, the invention relates to an epoxy resin composition useful for producing a fiber reinforced composite material that maintains a high mechanical strength in a severe operating environment, such as at a low temperature, and serves effectively as a structural member, and a prepreg, as well as fiber reinforced composite material.

BACKGROUND ART

With high specific strength and high specific modulus, fiber reinforced composite materials containing carbon fiber or aramid fiber as reinforcement fiber have been used in recent years for manufacturing of structural members of aircraft and automobiles, tennis rackets, golf shafts, fishing rods and other sports goods, as well as general industrial products.

The production processes commonly used for these fiber reinforced composite materials include the curing of a prepreg, i.e. a sheet-like intermediate material produced by impregnating reinforcement fiber with uncured matrix resin, and the resin transfer molding method which consists of placing reinforcement fiber in a mold, injecting a liquid resin in it to prepare an intermediate material, and then curing it. Of these production processes, the prepreg-based method commonly comprises stacking several prepreg sheets and heating and pressing them to mold a fiber reinforced composite material. From the viewpoint of productivity such as processability, thermosetting resins, epoxy resin in particular, have been commonly used as the matrix resin for these prepregs.

As demands increase, there has been much call in recent years for materials with reduced weight and increased strength for structural members of aircraft and automobiles in particular. Accordingly, the epoxy resin used as matrix resin is required to have high heat resistance.

In general, resin compositions with a high glass transition temperature, Tg, cure at a high temperature, and these resin compositions commonly contain much volatile constituents that volatilize when exposed to a high temperature during curing or molding processes. If a large amount of volatile matter volatilizes during curing, the volatile matter will be gasified when the material is used, for instance, as the surface layers of honeycomb panels. Consequently, it will be entrapped in the closed spaces of the honeycomb plates, and will expand there to cause damage to the adhesion between the surface layer and the honeycomb core. Such volatile matter can also form voids when laminated prepreg sheets are cured in an autoclave, leading to fiber reinforced composite materials with a decreased strength.

To provide a highly heat resistant epoxy resin composition with a small volatile matter content, a technique has been proposed to combine a polyfunctional epoxy resin and polyisocyanate or other appropriate polymers (see Patent document 1). This proposal, however, does not refer to strength of the fiber composite material produced by curing laminated prepreg plates.

To provide fiber reinforced composite materials with high strength, it is necessary for the reinforcement fiber to have enhanced strength and an increased volume fraction (high Vf) of fiber. A method to produce a high strength reinforcement fiber has been proposed conventionally (see Patent document 2). This proposal, however, does not refer to the strength of the resulting fiber reinforced composite material. In general, as the reinforcement fiber used has a higher strength, it tends to be more difficult to allow the component fiber to show its inherent strength. If the reinforcement fiber has an improved strand strength, for instance, it will be difficult to produce material with a sufficiently increased tensile strength. Instead, the rate of contribution to tensile strength, which is defined as (tensile strength of fiber reinforced composite material)/(reinforcement fiber's strand strength×fiber volume content)×100, tends to decrease. If carbon fiber with high strength is available, therefore, there remain technical problems to be solved to allow the strength to contribute to producing fiber reinforced composite materials with increased strength.

It has been known that even if using reinforcement fibers with the same level of strength, the rate of contribution to tensile strength can vary significantly depending on the matrix resin to be combined and the molding conditions to be used. If curing is to be performed at a high temperature of 180° C. or more, in particular, thermal stress takes place during the curing process and remains in the resulting fiber reinforced composite material, preventing it from developing high strength. Thus, studies have been carried out to provide improved matrix resins that can serve to develop adequate tensile strength even when cured at a temperature of 180° C.

It has been known that the use of a matrix resin with an increased tensile elongation at rupture serves to produce a fiber reinforced composite material with an improve rate of contribution to tensile strength. The tensile elongation at rupture of a matrix resin can be increased effectively by decreasing the crosslink density of the matrix resin, but a decrease in the crosslink density can reduce the heat resistance of the resulting fiber reinforced composite material. This limits the effective range of the blending ratio, posing a problem. To solve the problem, it is proposed that a high rate of contribution to tensile strength can be achieved when the tensile elongation at rupture and the fracture toughness, KIc, meet a specific relation (see Patent document 3). If a large amount of thermoplastic resin or a rubber component is added to the matrix resin with the aim of improving the fracture toughness, KIc, however, the viscosity will generally increase, leading to deterioration in the processability and handleability in the prepreg production process.

PRIOR ART DOCUMENTS

Patent Document

[Patent document 1] Japanese Unexamined Patent Publication (Kokai) No. 2001-31838
[Patent document 2] Japanese Unexamined Patent Publication (Kokai) No. HEI-11-241230
[Patent document 3] Japanese Unexamined Patent Publication (Kokai) No. HEI-9-235397

SUMMARY OF THE INVENTION

Problems to be Solved by the Invention

The invention aims to provide an epoxy resin composition useful for producing a carbon fiber reinforced composite material that is low in content of components that volatilize during curing, high in heat resistance and mechanical strength in a severe operating environment, such as at a low temperature, and suitable for producing structural members, and a prepreg, as well as carbon fiber reinforced composite materials.

Means of Solving the Problems

To meet the above-mentioned objectives, the invention has any of the following constitutions. Specifically, an epoxy resin composition comprising at least the constituent elements [A], [B], and [C] described below, wherein the constituent elements [A] and [B] account for 10 to 60 mass % and 40 to 80 mass %, respectively, per 100 mass %, i.e. the total quantity, of the epoxy resin contained, wherein
[A]: an epoxy resin comprising two or more ring structures each consisting of four or more members, and at least one amine type or ether type glycidyl group directly connected to the ring structures,
[B]: a tri- or more-functional epoxy resin, and
[C]: a curing agent.
According to the invention, furthermore, said epoxy resin composition may be cured to produce a cured resin, or may contain carbon fiber to produce a carbon fiber reinforced composite material, or a prepreg may be produced by impregnating carbon fiber with said epoxy resin composition and cured to produce a carbon fiber reinforced composite material.

According to a preferred embodiment of the epoxy resin composition of the invention, said epoxy resin [A] is a bifunctional epoxy resin having a structure as represented by Formula (1):

[Chemical compound 1]

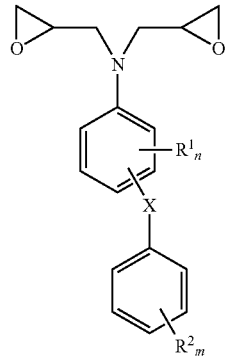

(1)

In the formula, $R^1$ and $R^2$ each denote at least one selected from the group of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group, and a nitro group. If there are more than one $R^1$ or more than one $R^2$, they may be identical to or different from each other, and n and m represent an integer of 0 to 4 and an integer of 0 to 5, respectively. X is one selected from the group of —O—, —S—, —CO—, —C(=O)O—, and —SO$_2$—.

According to a preferred embodiment of the epoxy resin composition of the invention, said epoxy resin [A] is a monofunctional epoxy resin comprising two or more ring structures each consisting of four or more members, and at least one glycidyl amino group or glycidyl ether group directly connected to one of the ring structures.

According to a preferred embodiment of the epoxy resin composition of the invention, said curing agent [C] is an aromatic amine.

According to the invention, furthermore, said epoxy resin composition may be cured to produce a cured resin, or a prepreg may be produced by impregnating reinforcement fiber with said epoxy resin composition and cured to produce a fiber reinforced composite material.

Effect of the Invention

The invention can provide a fiber reinforced composite material that is low in volatile content, high in heat resistance, and good in strength properties, as well as an epoxy resin composition and a prepreg for production thereof.

In particular, carbon fiber reinforced composite materials produced from this epoxy resin composition will have very high strength characteristics at low temperatures, and therefore, will be used preferably for production of the main wings of aircraft, blades of windmills, and other large-type structure members that can suffer a distributed load.

DESCRIPTION OF EMBODIMENTS

The epoxy resin composition, prepreg and carbon fiber reinforced composite material according to the invention are described in detail below.

The epoxy resin composition of the invention contains: an epoxy resin [A] that comprises two or more ring structures each consisting of four or more members, and at least one amine type or ether type glycidyl group directly connected to one of the ring structures, a tri—or more—functional epoxy resin [B], and a curing agent [C].

For the epoxy resin composition of the invention, said epoxy resin [A] that comprises two or more ring structures each consisting of four or more members refers to one having two or more monocyclic structures each consisting of four or more members, such as cyclohexane, benzene, and pyridine, or one having at least one condensed ring formed from four—or more—membered rings, such as phthalimide, naphthalene, and carbazole.

In said amine type glycidyl group or ether type glycidyl group directly connected to a ring structure of the epoxy resin [A], a nitrogen atom of the amine type group or an oxygen atom of the ether type group is connected to a ring structure such as benzene and phthalimide. Thus, the epoxy resin is either monofunctional or bifunctional when the group is of an amine type, while it is monofunctional when the group is of an ether type. (Hereinafter, a monofunctional epoxy resin [A] and a bifunctional epoxy resin [A] may be referred to as [A1] and [A2], respectively.)

A carbon fiber reinforced composite material with improved strength will not be produced if the content of the epoxy resin [A] is too small, while only poor heat resistance can be achieved if the content is too large. Accordingly, the epoxy resin [A] should account for 5 to 60 mass % of the total quantity of the epoxy resin. A high strength will be achieved if the resin [A] is a monofunctional epoxy resin, while a high heat resistance will be achieved if the resin [A] is a bifunctional epoxy resin. Thus, the content of the resin [A] is preferably 10 to 40 mass %, more preferably 15 to 30 mass %, of the total quantity of the epoxy resin in the case where it is [A1]. It is preferably 25 to 60 mass %, more preferably 30 to 50 mass %, of the total quantity of the epoxy resin in the case where it is [A2].

Examples of the epoxy resin [A1] to be used for the invention include, for instance, glycidylphthalimide, glycidyl-1,8-naphthalimide, glycidyl carbazole, glycidyl-3,6-dibromocarbazole, glycidyl indole, glycidyl-4-acetoxy indole, glycidyl-3-methyl indole, glycidyl-3-acetyl indole, glycidyl-5- methoxy-2-methyl indole, o-phenyl phenyl glycidyl ether, p-phenyl phenyl glycidyl ether, p-(3-methyl phenyl)phenyl glycidyl ether, 2,6-dibenzyl phenyl glycidyl ether, 2-benzyl phenyl glycidyl ether, 2,6-diphenyl phenyl glycidyl ether, 4-α-cumyl phenyl glycidyl ether, o-phenoxy phenyl glycidyl ether, and p-phenoxy phenyl glycidyl ether.

Examples of the epoxy resin [A2] to be used for the invention include, for instance, N,N-diglycidyl-4-phenoxy aniline, N,N-diglycidyl-4-(4-methyl phenoxy)aniline, N,N-diglycidyl-4-(4-tert-butyl phenoxy)aniline, and N,N-diglycidyl-4-(4-phenoxy phenoxy) aniline. Many of these resins can be produced by adding epichlorohydrin to phenoxy aniline derivative and cyclized with an alkali compound. An increase in molecular weight will lead to an increase in viscosity, and accordingly, N,N-diglycidyl-4-phenoxy aniline, i.e. an epoxy resin [A2] in which both $R^1$ and $R^2$ is a hydrogen atom, is particularly preferred from the viewpoint of handleability.

Examples of said phenoxy aniline derivative specifically include 4-phenoxy aniline, 4-(4-methyl phenoxy)aniline, 4-(3-methyl phenoxy)aniline, 4-(2-methyl phenoxy)aniline, 4-(4-ethyl phenoxy) aniline, 4-(3-ethyl phenoxy)aniline, 4-(2-ethyl phenoxy)aniline, 4-(4-propyl phenoxy)aniline, 4-(4-tert-butyl phenoxy)aniline, 4-(4-cyclohexyl phenoxy)aniline, 4-(3-cyclohexyl phenoxy)aniline, 4-(2-cyclohexyl phenoxy)aniline, 4-(4-methoxy phenoxy)aniline, 4-(3-methoxy phenoxy)aniline, 4-(2-methoxy phenoxy)aniline, 4-(3-phenoxy phenoxy)aniline, 4-(4-phenoxy phenoxy)aniline, 4-[4-(trifluoromethyl)phenoxy]aniline, 4-[3-(trifluoromethyl)phenoxy]aniline, 4-[2-(trifluoromethyl)phenoxy]aniline, 4-(2-naphthyl oxy phenoxy)aniline, 4-(1-naphthyl oxy phenoxy) aniline, 4-[(1,1'-biphenyl-4-yl)oxy]aniline, 4-(4-nitro phenoxy)aniline, 4-(3-nitro phenoxy)aniline, 4-(2-nitro phenoxy)aniline, 3-nitro-4-aminophenyl phenyl ether, 2-nitro-4-(4-nitro phenoxy)aniline, 4-(2,4-dinitro phenoxy) aniline, 3-nitro-4-phenoxy aniline, 4-(2-chlorophenoxy) aniline, 4-(3-chlorophenoxy)aniline, 4-(4-chlorophenoxy) aniline, 4-(2,4-dichlorophenoxy)aniline, 3-chloro-4-(4-chlorophenoxy)aniline, and 4-(4-chloro-3-tolyl oxy)aniline.

The production method for the epoxy resin [A2] used for the invention is described below with reference to examples.

The epoxy resin [A2] used for the invention can be produced by reacting epichlorohydrin with a phenoxy aniline derivative as represented by General formula (2) described below.

[Chemical compound 2]

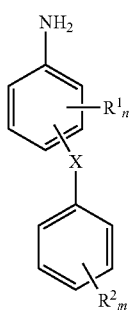

(2)

In the formula, $R^1$ and $R^2$ each denote at least one selected from the group of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group, and a nitro group. If there are more than one $R^1$ or more than one $R^2$, they may be identical to or different from each other, and n and m represent an integer of 0 to 4 and an integer of 0 to 5, respectively. X is one selected from the group of —O—, —S—, —CO—, —C(=O)O—, and —SO$_2$—.

Specifically, as in the case of generally practiced epoxy resin production, an epoxy resin [A2] can be produced by first adding two molecules of epichlorohydrin to one molecule of a phenoxy aniline derivative to produce a dichlorohydrin as represented by the following General formula (3).

[Chemical compound 3]

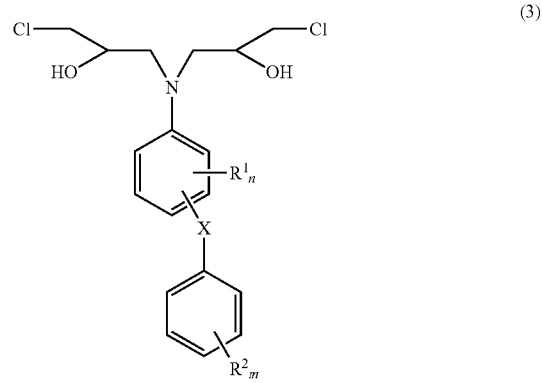

(3)

In the formula, $R^1$ and $R^2$ each denote at least one selected from the group of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group, and a nitro group. If there are more than one $R^1$ or more than one $R^2$, they may be identical to or different from each other, and n and m represent an integer of 0 to 4 and an integer of 0 to 5, respectively. X is one selected from the group of —O—, —S—, —CO—, —C(=O)O—, and —SO$_2$—. This addition reaction step is followed by a cyclization step that dehydrochlorinates the dichlorohydrin with an alkali compound to produce a bifunctional epoxy compound as represented by the following General formula (1).

[Chemical compound 4]

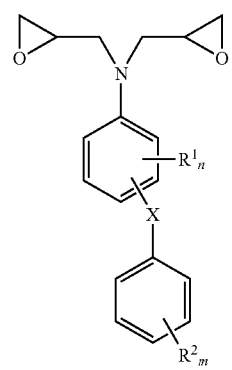

(1)

In the formula, $R^1$ and $R^2$ each denote at least one selected from the group of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group, and a nitro group. If there are more than one $R^1$ or more than one $R^2$, they may be identical to or different from each other, and n and m represent an integer of 0 to 4 and an integer of 0 to 5, respectively. X is one selected from the group of —O—, —S—, —CO—, —C(=O)O—, and —SO$_2$—.

Commercial products of [A1] include Denacol (registered trademark) Ex-731 (glycidylphthalimide, supplied by Nagase ChemteX Corporation), and OPP-G (o-phenyl phenyl glycidyl ether, supplied by Sanko Co., Ltd.), while commercial products of [A2] include PxGAN (diglycidyl-p-phenoxy aniline, supplied by Toray Fine Chemicals Co., Ltd.).

Said tri- or more-functional epoxy resin [B] used for the invention is a compound having three or more epoxy groups in one molecule. Examples of said tri- or more-functional epoxy resin [B] include, for instance, glycidyl amine type epoxy resins and glycidyl ether type epoxy resins.

Said tri- or more-functional epoxy resin [B] preferably contains 3 to 7, more preferably 3 to 4, functional groups. If it contains too many functional groups, the cured matrix resin will be brittle, possibly leading to a low impact resistance.

Examples of said tri- or more-functional glycidyl amine type epoxy resin include, for instance, diaminodiphenyl methane type, diaminodiphenyl sulfone type, aminophenol type, meta-xylene diamine type, 1,3-bisaminomethyl cyclohexane type, and isocyanurate type epoxy resins. Of these, diaminodiphenyl methane type and aminophenol type epoxy resins are particularly preferable due their highly balanced physical properties.

Examples of said tri- or more-functional glycidyl ether type epoxy resin include, for instance, phenol novolac type, orthocresol novolac type, tris-hydroxyphenyl methane type, and tetraphenylol ethane type epoxy resins.

The heat resistance will be decreased if the content of said tri- or more-functional epoxy resin [B] is too small, while if it is too high, the crosslink density will be high and the resulting material will be brittle, possibly leading to a carbon fiber reinforced composite material with poor impact resistance and strength. The tri- or more-functional epoxy resin preferably accounts for 40 to 80 mass %, more preferably 50 to 70 mass %, of the sum of the epoxy resin [A] and the tri- or more-functional epoxy resin [B] (the total quantity of the epoxy resins) which accounts for 100 mass %.

For the invention, components such as other epoxy resins and copolymers of an epoxy resin and a thermosetting resin may be contained in addition to the components [A] and [B]. Examples of said thermosetting resin to be copolymerized with an epoxy resin include, for instance, unsaturated polyester resin, vinyl ester resin, epoxy resin, benzoxazine resin, phenol resin, urea resin, melamine resin, and polyimide resin. These resin compositions and compounds may be used singly or in combination appropriately. The addition of an epoxy resin other than the components [A] and [B] can serve to provide a resin with an increased flowability and a cured material with an increased heat resistance. From the viewpoint of flowability, an epoxy resin that is in a liquid state at room temperature (25° C.) is used preferably. A thermosetting resin specimen is deemed to be in a liquid state if a metal piece having a specific gravity of 7 or, more and virtually the same temperature as the thermosetting resin specimen immediately starts sinking into the thermosetting resin specimen when put on it. Examples of said metal having a specific gravity of 7 or more include, for instance, iron (steel), cast iron, and copper. The use of at least one liquid epoxy resin combined with at least one solid epoxy resin serves to provide a prepreg having proper tackiness and drape properties. From the viewpoint of tackiness and drape properties, it is preferable that the liquid epoxy resins including the components [A] and [B] preferably account for 20 mass % or more of the total quantity (100 mass %) of the epoxy resins contained in the epoxy resin composition of the invention.

For said tri- or more-functional epoxy resin [B], commercial diaminodiphenyl methane type epoxy resin products of include ELM434 (supplied by Sumitomo Chemical Co., Ltd.), Araldite (registered trademark) MY720, Araldite (registered trademark) MY721, Araldite (registered trademark) MY9512, and Araldite (registered trademark) MY9663 (supplied by Huntsman Advanced Materials Gmbh), and Epotohto (registered trademark) YH-434 (supplied by Tohto Kasei Co., Ltd.).

Commercial meta-xylene diamine type epoxy resin products include TETRAD-X (supplied by Mitsubishi Gas Chemical Co., Inc.).

Commercial 1,3-bisaminomethyl cyclohexane type epoxy resin products include TETRAD-C (supplied by Mitsubishi Gas Chemical Co., Inc.).

Commercial isocyanurate type epoxy resin products include TEPIC-P (supplied by Nissan Chemical Industries, Ltd.).

Commercial tris-hydroxyphenyl methane type epoxy resin products include Tactix 742 (supplied by Huntsman Advanced Materials Gmbh).

Commercial tetraphenylol ethane type epoxy resin products include jER (registered trademark) 1031S (supplied by Japan Epoxy Resins Co., Ltd.).

Commercial aminophenol type epoxy resin products include ELM120 and ELM100 (supplied by Sumitomo Chemical Co., Ltd.), jER (registered trademark) 630 (supplied by Japan Epoxy Resins Co., Ltd.), and Araldite (registered trademark) MY0510 (supplied by Huntsman Advanced Materials Gmbh), Araldite (registered trademark) MY0600 (supplied by Huntsman Advanced Materials Gmbh), and Araldite (registered trademark) MY0610 (supplied by Huntsman Advanced Materials Gmbh).

Commercial phenol novolac type epoxy resin products include DEN431 and DEN438 (supplied by The Dow Chemical Company), and jER (registered trademark) 152 (supplied by Japan Epoxy Resins Co., Ltd.).

Commercial orthocresol novolac type epoxy resin products include EOCN-1020 (supplied by Nippon Kayaku Co., Ltd.) and Epicron (registered trademark) N-660 (supplied by DIC Corporation).

Commercial dicyclopentadiene type epoxy resin products include Epicron (registered trademark) HP7200 (supplied by DIC Corporation).

With respect to said epoxy resin other than the components [A] and [B], preferred examples of said bifunctional epoxy resin include glycidyl ether type epoxy resins produced from a phenol as precursor. Such epoxy resins include bisphenol A type epoxy resin, bisphenol F type epoxy resin, bisphenol S type epoxy resin, naphthalene type epoxy resin, biphenyl type epoxy resin, urethane modified epoxy resin, hydantoin type epoxy resin, and resorcinol type epoxy resin.

Being low in viscosity, liquid-state bisphenol A type epoxy resin, bisphenol F type epoxy resin, and resorcinol type epoxy resin are preferably used in combination with other epoxy resins.

As compared with liquid-state bisphenol A type epoxy resin, solid-state bisphenol A type epoxy resin forms a structure with a lower crosslink density and has a lower heat resistance, but the structure has a higher ductility. Thus, it is commonly used in combination with other components such as glycidyl amine type epoxy resin, liquid-state bisphenol A type epoxy resin, and liquid-state bisphenol F type epoxy resin.

An epoxy resin with a naphthalene backbone can produce a cured resin with a low water absorption percentage and a high heat resistance. Biphenyl type epoxy resin, dicyclopentadiene type epoxy resin, phenol aralkyl type epoxy resin, and diphenyl fluorene type epoxy resin are also used preferably because they can produce a cure resin with a low water absorption percentage. Urethane modified epoxy resin and isocyanate modified epoxy resin can produce a cure resin with a high fracture toughness and a high elongation percentage.

Commercial bisphenol A type epoxy resin products include EPON (registered trademark) 825 (supplied by Japan Epoxy Resins Co., Ltd.), Epicron (registered trademark) 850 (supplied by DIC Corporation), Epotohto (registered trademark) YD-128 (supplied by Tohto Kasei Co., Ltd.), and DER-331 and DER-332 (supplied by The Dow Chemical Company).

Commercial bisphenol F type epoxy resin products include jER (registered trademark) 806, jER (registered trademark) 807 and jER (registered trademark) 1750 (supplied by Japan Epoxy Resins Co., Ltd.), Epicron (registered trademark) 830 (supplied by DIC Corporation), and Epotohto (registered trademark) YD-170 (supplied by Tohto Kasei Co., Ltd.).

Commercial resorcinol type epoxy resin products include Denacol (registered trademark) EX-201 (supplied by Nagase ChemteX Corporation).

Commercial glycidyl aniline type epoxy resin products include GAN and GOT (supplied by Nippon Kayaku Co., Ltd.).

Commercial biphenyl type epoxy resin products include NC-3000 (supplied by Nippon Kayaku Co., Ltd.).

Commercial urethane modified epoxy resin products include AER4152 (supplied by Asahi Kasei Corporation epoxy).

Commercial hydantoin type epoxy resin products include AY238 (supplied by Huntsman Advanced Materials Gmbh).

To achieve a good balance between the adhesiveness to reinforcement fiber and mechanical properties, it is preferable that glycidyl amine type epoxy resin accounts for 30 to 70 parts by mass, more preferably 40 to 60 parts by mass, of the total epoxy resin composition.

It is preferable that the epoxy resin composition for fiber reinforced composite material according to the invention is used in combination with a curing agent [C]. The curing agent as referred to here is intended to cure the epoxy resin contained in the epoxy resin composition of the invention, and it is a compound having an active group that can react with an epoxy group. Specifically, examples of said curing agent include, for instance, dicyandiamide, aromatic polyamine, aminobenzoic acid esters, various anhydrides, phenol novolac resin, cresol novolac resin, polyphenol compound, imidazole derivatives, aliphatic amine, tetramethyl guanidine, thiourea-amine adduct, methyl hexahydrophthalic anhydride, other such carboxylic anhydrides, carboxylic acid hydrazide, carboxylic acid amide, polymercaptan, boron trifluoride ethylamine complex, and other Lewis acid complexes.

The use of aromatic polyamine as curing agent serves to produce a highly heat resistant epoxy resin. Among other aromatic polyamines, various isomers of diaminodiphenyl sulfone are highly suitable curing agents to produce highly heat resistant epoxy resins.

The use of a combination of dicyandiamide with a urea compound, such as 3,4-dichlorophenyl-1,1-dimethylurea, or an imidazole as curing agent serves to produce a highly heat and water resistant resin at a relatively low curing temperature. As compared with using an amine compound as curing agent, a cured resin with a lower water absorption percentage can be produced when an anhydride is used to cure an epoxy resin. Latent forms, such as microencapsulated forms, of these curing agents can work to produce a prepreg with preservation stability that suffer little changes in tackiness and drape properties when left to stand at room temperature.

The optimum content of a curing agent depends on the type of epoxy resin and curing agent used. In the case of an aromatic amine used as curing agent, for instance, it is commonly preferable that its content is stoichiometrically equivalent. In some cases, however, a resin with a higher elastic modulus than in the case of the stoichiometrically equivalent quantity may be produced by adjusting the ratio of the quantity of active hydrogen in the aromatic amine used as curing agent to the quantity of epoxy groups in the epoxy resin to about 0.7 to 0.9, which also represents a preferred embodiment. These curing agents may be used singly or as a mixture of two or more thereof.

Commercial aromatic polyamine based curing agent products include Seikacure S (supplied by Wakayama Seika Kogyo Co., Ltd.), MDA-220 (supplied by Mitsui Chemicals, Inc.), jER Cure (registered trademark) W (supplied by Japan Epoxy Resins Co., Ltd.), 3,3'-DAS (supplied by Mitsui Chemicals, Inc.), Lonzacure (registered trademark) M-DEA (supplied by Lonza Ltd.), Lonzacure (registered trademark) M-DIPA (supplied by Lonza Ltd.), Lonzacure (registered trademark) M-MIPA (supplied by Lonza Ltd.), and Lonzacure (registered trademark) DETDA 80 (supplied by Lonza Ltd.).

These epoxy resins and curing agents, or their partial preliminary reaction products may be contained in the composition. In some cases, this method is effective for viscosity adjustment and storage stability improvement.

For the invention, it is also preferable that a thermoplastic resin is mixed or dissolved in said epoxy resin composition. Preferable examples of said thermoplastic resin commonly include those thermoplastic resins whose backbone chain contain a bond selected from the group of carbon-carbon bond, amide bond, imide bond, ester bond, ether bond, carbonate bond, urethane bond, thioether bond, sulfone bond, and carbonyl bond. Said thermoplastic resin may be partially crosslinked and may be either crystalline or amorphous. In particular, it is preferable that at least one resin selected from the group of polyamide, polycarbonate, polyacetal, polyphenylene oxide, polyphenylene sulfide, polyallylate, polyester, polyamide-imide, polyimide, polyetherimide, phenyltrimethylindane-based polyimide, polysulfone, polyethersulfone, polyether ketone, polyether ether ketone, polyaramid, polyether nitrile, and polybenz imidazole, is mixed or dissolved in any of the epoxy resins contained in said epoxy resin composition.

To achieve a high heat resistance, in particular, the glass transition temperature (Tg) of the thermoplastic resin is at least 150° C. or more, preferably 170° C. or more. If the glass transition temperature of the thermoplastic resin added is less than 150° C., the resulting moldings will tend to suffer thermal deformation during use. Furthermore, said thermoplastic resin preferably contains a terminal functional group such as hydroxyl group, carboxyl group, thiol group, and anhydride, to allow reaction with a cationic-polymerizing compound. Specifically, useful commercial polyethersulfone products include Sumikaexcel (registered trademark) PES3600P, Sumikaexcel (registered trademark) PES5003P, Sumikaexcel (registered trademark) PES5200P, and Sumikaexcel (registered trademark) PES7600P (supplied by Sumitomo Chemical Co., Ltd.); Ultrason (registered trademark) E2020P SR and Ultrason (registered trademark) E2021SR (supplied by BASF); and GAFONE (registered trademark) 3600RP and GAFONE (registered trademark) 3000RP (supplied by Solvay Advanced Polymers). Others include oligomers for copolymerization of polyethersulfone and polyether ether sulfone as described Published Japanese Translation No. 2004-506789 of the PCT Application, and commercial polyetherimide products such as Ultem (registered trademark) 1000, Ultem (registered trademark) 1010, and Ultem (registered trademark) 1040 (supplied by Solvay Advanced Polymers K.K.). The oligomer here refers to a relatively low molecular weight compound composed of a finite number (about 10 to 100) of monomers bonded together.

The use of a mixture of an epoxy resin and a thermoplastic resin tends to produce better results than their independent use. The brittleness of the epoxy resin can be offset by the toughness of the thermoplastic resin, and the poor moldability of the thermoplastic resin can be offset by the epoxy resin, leading to a well-balanced base resin. With respect to the constituent ratio (mass %) between the epoxy resin and the thermoplastic resin, the thermoplastic resin preferably accounts for 2 to 40 mass %, more preferably 5 to 30 mass %, per 100 mass % of the epoxy resins to maintain a good balance.

For the epoxy resin composition for fiber reinforced composite material according to the invention, it is preferable that the constituent elements (components) other than the curing agent [C] are first heated and kneaded uniformly at a temperature of about 150 to 170° C., and then cooled to a temperature of about 60° C., followed by addition of the curing agent [C] and further kneading, though the way of mixing the components is not limited to this.

For the invention, it is also preferable that thermoplastic resin particles are added to the epoxy resin composition of the invention. The addition of said thermoplastic resin particles serves to increase the toughness of the matrix resin and produce carbon fiber reinforced composite materials with an improve impact resistance.

Said thermoplastic resin particles that can be used for the invention should be properly mixed or dissolved in the epoxy resin composition, and examples of such thermoplastic resin include those thermoplastic resin examples listed previously. In particular, polyamide is the most preferable, and of the various polyamide polymers, nylon 12, nylon 11, and nylon 6/12 copolymer can develop a high adhesive strength when bonded to a thermosetting resin. With respect to shape, said thermoplastic resin particles may be spherical or nonspherical, and may be porous, but spherical particles are preferred because of being high in viscoelasticity to prevent the resin's flow characteristics from deteriorating and also being free from starting points for stress concentration to ensure a high impact resistance. Commercial polyamide particle products include SP-500 (supplied by Toray Industries, Inc.), Toraypearl (registered trademark) TN (supplied by Toray Industries, Inc.), Orgasol (registered trademark) 1002D (supplied by Atochem), Orgasol (registered trademark) 2002 (supplied by Atochem), Orgasol (registered trademark) 3202 (supplied by Atochem), and Trogamid T5000.

The epoxy resin composition of the invention may contain coupling agents, thermosetting resin particles, thermoplastic resin dissolvable in epoxy resin, and inorganic fillers such as silica gel, carbon black, clay, carbon nanotube, and metal powder, as long as they do not impair the effect of the invention.

As stated previously, resin compositions with a high glass transition point Tg commonly can cure at a high temperature, and such resin compositions tend to contain much volatile components that volatilize during curing. If such volatile components volatilize heavily during curing, it will lead to, for instance, formation of voids during the molding process of laminated prepreg, possibly resulting in fiber reinforced composite material with poor strength. The organic compounds that volatilize, furthermore, will pose problems in securing safety of work environment.

The volatilization volume of the epoxy resin composition tends to increase with the temperature that it is exposed to. The epoxy resin composition is more likely to gelate quickly and release less mounts of volatile matter as the temperature further increases, and accordingly, the volatilization volume tends to level off below the curing temperature. In the case of an aromatic polyamine based material, which requires a high curing temperature, for instance, the volatilization volume levels off at a temperature about 150 to 180° C., depending on the heating rate. For a material that cures at 180° C., for instance, it is preferable that the volatilization volume is measured at 160° C. where the heating rate does not have significant influence.

Thus, the volatilization volume during heating is preferable to reduce the formation of voids during molding of fiber reinforced composite materials. Specifically, the volatilization volume is preferably 0.2 to 5% or less, more preferably 0.02 to 3% or less, when a prepreg plate is left for 20 minutes in a hot air drier.

Examples of said reinforcement fiber used in the prepreg according to the invention include carbon fiber, glass fiber, aramid fiber, boron fiber, PBO fiber, high-strength polyethylene fiber, alumina fiber, and silicon carbide fiber. Two or more of these fibers may be used in combination. There are no specific limitations on the shape and structure of the reinforcement fiber, and they may be fiber structures in the form of, for instance, pulled-and-paralleled long fibers, single tow, woven fabric, knit fabric, nonwoven fabric, mat, and braid.

For uses where lightweight, high-strength materials are required, in particular, carbon fiber is used preferably because of its high specific modulus and high specific strength.

With respect to said carbon fiber used for the invention, any type of carbon fiber may be used as appropriate according to the uses. From the viewpoint of impact resistance, however, it is preferable to use carbon fibers with a tensile modulus of 400 GPa or less. From the viewpoint of strength, carbon fibers with a tensile modulus of 4.4 to 6.5 GPa have been preferred because composite materials with a high rigidity and mechanical strength can be produced. Tensile elongation is also an important factor, and high-strength, high-elongation carbon fibers with a tensile elongation of 1.7 to 2.3% have been preferred. Thus, the most suitable carbon fibers will have a tensile modulus of at least 230 GPa, tensile strength of at least 4.4 GPa, and tensile elongation of at least 1.7%.

Commercial carbon fiber products include Torayca (registered trademark) T800G-24K, Torayca (registered trademark) T800S-24K, Torayca (registered trademark) T700G-24K, Torayca (registered trademark) T300-3K, and Torayca (registered trademark) T700S-12K (supplied by Toray Industries, Inc.).

With respect to the shape and structure of said carbon fiber, unidirectionally pulled-and-paralleled long fibers, woven fabric, and other similar materials may be used. To produce lightweight carbon fiber reinforced composite materials with a higher-level durability, it is preferable to use a carbon fiber in the form of continuous fibers such as unidirectionally pulled-and-paralleled long fibers (fiber bundles) or a woven fabric.

It is preferable that said carbon fiber used for the invention has a monofilament fineness of 0.2 to 2.0 dtex, more preferably 0.4 to 1.8 dtex. If the monofilament fineness is less than 0.2 dtex, the carbon fiber bundles may be more likely to suffer damage when coming in contact with the guide rollers during twining, and similar damage can also take place during impregnation of the resin composition. If the monofilament fineness is more than 2.0 dtex, the carbon fiber bundles will not be impregnated sufficiently with the resin composition, possibly leading to a decreased fatigue resistance.

It is preferable that said carbon fiber bundles used for the invention comprise 2,500 to 50,000 filaments per fiber bundle. Fibers will not align straight, possibly leading to a decreased strength, if the number of filaments is less than 2,500 per bundle. Resin impregnation may be difficult during prepreg preparation or molding if the number of filaments is more than 50,000 per bundle. The number of filaments is more preferably in the range of 2,800 to 40,000 per bundle.

Said prepreg of the invention is produced by impregnating carbon fiber with said epoxy resin composition for fiber reinforced composite materials. It is preferable that the content by mass of the carbon fiber in said prepreg is preferably 40 to 90 mass %, more preferably 50 to 80 mass %. If the carbon fiber content by mass is too small, the resulting composite material will have an excessively large mass, possibly failing to produce an intended fiber reinforced composite material with a high specific strength and specific modulus, while the carbon fiber content by mass is too large, impregnation with the resin composition will not be achieved sufficiently, and the resulting composite material will be likely to suffer many voids, leading to a significant deterioration in its mechanical properties.

With respect to the structure of said prepreg of the invention, it is preferable that a particle-rich layer (hereinafter occasionally referred to simply as particle layer), in which all of the above mentioned particles are clearly seen to be localized, is formed near the surface of the prepreg.

When prepreg plates of such a structure are laminated and subsequently processed into a carbon fiber reinforced composite material by curing the epoxy resin, a resin layer will be likely to be formed between the prepreg layers, i.e. composite material layers, which acts to achieve strong adhesion and contact between the composite material layers, leading to a carbon fiber reinforced composite material with a high impact resistance.

From this viewpoint, it is preferable that said particle layer exists within the thickness range from the surface of the prepreg plate to a depth equivalent to 20%, more preferably 10%, of the total prepreg layer thickness. Said particle layer may exist only on one side of the prepreg plate, but care should be taken because the prepreg plate will have two sides with different properties. If prepreg plates are stacked improperly, there will be particle-rich and particle-free interfaces, leading to a composite material with poor impact resistance. It is preferable that a particle layer is provided on both sides of the prepreg plate to prevent it from having two sides with different properties to ensure easy stacking.

The content of the thermoplastic resin particles existing in the particle layers is preferably 90 to 100 mass %, more preferably 95 to 100 mass %, per total 100 mass % of the thermoplastic resin particles contained in the prepreg plate.

This content of thermoplastic resin particles can be measured, for instance, by the following method. Specifically, a prepreg plate is sandwiched between two polytetrafluoroethylene resin plates with smooth surfaces, and after achieving good contact, they are heated gradually for seven days up to the curing temperature to ensure gelation and curing, thus producing a cured prepreg plate. For each side of the cured prepreg plate, a line parallel to each surface of the prepreg plate is drawn at a depth from the surface equivalent to 20% of the thickness of the cured prepreg plate. Then, the total area of the particles existing between the prepreg surface and said line and the total area of the particles existing across the thickness of the prepreg plate are measured, followed by calculating the proportion of the particles existing within the depth range from the prepreg surface to 20% of the total thickness to those existing across the entire thickness. Here, the total area of particles is determined by cutting out particle regions from a photograph of the cross section and calculating their proportion from their weight. If particles dispersed in the resin cannot be easily defined in photographs, it may be effective to dye the particles.

A prepreg plate according to the invention can be produced by applying the methods disclosed in Japanese Unexamined Patent Publication (Kokai) No. HEI-1-26651, Japanese Unexamined Patent Publication (Kokai) No. SHO-63-170427, and Japanese Unexamined Patent Publication (Kokai) No. SHO-63-170428. Specifically, a prepreg plate according to the invention can be produced by applying particles of the thermoplastic resin directly over the surface of a preliminary prepreg plate consisting of carbon fiber and matrix epoxy resin; preparing a mixture of said particles mixed uniformly in matrix epoxy resin, and during the process of impregnating carbon fiber with this mixture, causing the reinforcement fiber to block the penetration of the particles so that particles are localized near the surface of the prepreg plate; or impregnating carbon fiber with the epoxy resin to prepare preliminary prepreg plates, and subsequently applying a thermosetting resin film containing a large amount of the particles over the surface of the preliminary prepreg plates. A prepreg useful for producing high impact resistant fiber composite materials can be produced by allowing the thermoplastic resin particles to disperse uniform over the depth range down to 20% of the total thickness of the prepreg.

The prepreg according to the invention can be produced by the wet method that dissolves the epoxy resin composition of the invention in a solvent such as methyl ethyl ketone and methanol to reduce its viscosity and impregnating reinforcement fiber with it or the hot melt method that heat the epoxy resin composition to reduce its viscosity and impregnating reinforcement fiber with it.

In the wet method, reinforcement fiber is immersed in a solution of the epoxy resin composition and after taking it out, the solvent is evaporated using an appropriate apparatus such as oven to produce a prepreg.

In the hot melt method, the epoxy resin composition is heated to reduce its viscosity and used directly to impregnate reinforcement fiber; or resin film prepared by coating release paper or the like with the epoxy resin composition, applied over one side or both sides of reinforcement fiber, and heated and compressed to transfer and impregnate the epoxy resin composition into the fiber to provide a prepreg. The hot melt method is preferred because the prepreg is virtually free from residual solvent.

The fiber reinforced composite material of the invention can be produced by, for instance, stacking two or more prepreg plates produced by these methods, followed by heating and pressing the resulting layered product to heat and cure the epoxy resin.

Said heating and pressing may be carried out by methods such as press molding, autoclave molding, bagging molding, wrapping tape molding, and internal pressure molding. In particular, wrapping tape molding and internal pressure molding have been preferred to produce molded sports goods.

The wrapping tape molding method uses a core bar such as mandrel which is wound with a prepreg plate to produce a tube of fiber reinforced composite material, and this method is suitable for manufacturing rod-like articles such as golf club shaft and fishing rod. More specifically, a mandrel is wound with a prepreg plate and furthermore wound with a wrapping tape of thermoplastic resin film to secure and press the prepreg plate, followed by heating and curing the epoxy resin in an oven and removing the core bar to provide tubular material.

In the internal pressure molding method, a preform consisting of an internal pressure applying body such as thermoplastic resin tube wound with a prepreg plate is placed in a mold, and high pressure gas is introduced through the internal pressure applying body to apply pressure and heat the mold simultaneously to provide tube. The internal pressure molding method has been particularly preferred to produce molded articles with a complicated shape such as golf club shaft, bat, and rackets for tennis and badminton.

The carbon fiber reinforced composite material of the invention can be produced by, for instance, stacking sheets of the above-mentioned prepreg of the invention into a predetermined shape and then pressed and heated to cure the epoxy resin.

The fiber reinforced composite material of the invention can be produced from said epoxy resin composition without prepreg formation.

This can be carried out by, for instance, impregnating reinforcement fiber directly with the epoxy resin composition of the invention, followed by heating for curing, and the useful methods include hand lay-up, filament winding, pultrusion, resin injection molding, and resin transfer molding. In these methods, one or more epoxy base resins are preferably mixed with one or more curing agents immediately before use in order to prepare an epoxy resin composition.

The carbon fiber reinforced composite material of the invention has been preferred for production of aircraft structural members, windmill blades, automobile exterior plates, IC trays, notebook computer housing, and other computer components, as well as golf club shaft, tennis racket, and other sports goods.

EXAMPLES

The epoxy resin composition of the invention as well as a prepreg and a fiber reinforced composite material produced therefrom are described in detail below with reference to Examples. The resin materials used in Examples, preparation methods for prepregs and fiber reinforced composite materials, heat resistance evaluation method for cured resin, and tensile strength evaluation are as follows. Prepreg preparation and evaluation in Examples were carried out in an atmosphere with a temperature of 25° C.±2° C. and relative humidity of 50% unless otherwise specified.

<Carbon Fiber (Reinforcement Fiber)>
    Torayca (registered trademark) T800G-24K-31E (carbon fiber with 24,000 filaments/bundle, tensile strength of 5.9 GPa, tensile modulus of 294 GPa, tensile elongation of 2.0%, supplied by Toray Industries, Inc.).
<Epoxy Resin>
Epoxy Resin [A]
    N,N-diglycidyl-4-phenoxy aniline ([A2]) synthesized as described below In a four-necked flask equipped with a thermometer, dropping funnel, cooling pipe and stirrer, 610.6 g (6.6 mol) of epichlorohydrin was poured and heated up to a temperature of 70° C. while performing nitrogen purge, and a solution of 203.7 g (1.1 mol) of p-phenoxy aniline dissolved in 1,020 g of ethanol was dropped in 4 hours. The solution is stirred for additional 6 hours to ensure completion of the addition reaction to provide 4-phenoxy-N,N-bis(2-hydroxy-3-chloropropyl)aniline. Then, the flask was heated up to an internal temperature of 25° C., and 229 g (2.75 mol) of 48% aqueous NaOH solution was dropped in 2 hours, followed by additional stirring for 1 hour. After the completion of the cyclization reaction, ethanol was evaporated and extraction was carried out with 408 g of toluene, followed by washing twice with 5% saline solution. Toluene and epichlorohydrin were removed from the organic layer under reduced pressure, resulting in 308.5 g (yield 94.5%) of a brown viscous liquid. The main product N,N-diglycidyl-4-phenoxy aniline had a purity of 91% (GC area %).

N,N-diglycidyl-4-(4-nitro phenoxy)aniline ([A2]) synthesized as described below

Except that N,N-diglycidyl-4-(4-nitro phenoxy)aniline was used as the amine compound acting as precursor for synthesizing the epoxy resin, the same procedures as for the N,N-diglycidyl-4-phenoxy aniline was carried out under the same reaction conditions for glycidyl formation, producing N,N-diglycidyl-4-(4-nitro phenoxy)aniline N,N-diglycidyl-4-(4-methyl phenoxy) aniline ([A2]) synthesized as described below Except that 4-(4-methyl phenoxy)aniline was used as the amine compound acting as precursor for synthesizing the epoxy resin, the same procedures as for the N,N-diglycidyl-4-phenoxy aniline was carried out under the same reaction conditions for glycidyl formation, producing N,N-diglycidyl-4-(4-methyl phenoxy)aniline Denacol (registered trademark) Ex-731 (N-glycidylphthalimide, supplied by Nagase ChemteX Corporation) ([A1])
    OPP-G (o-phenyl phenyl glycidyl ether, supplied by Sanko Co., Ltd.) ([A1])
    N-glycidyl carbazole ([A1]) synthesized as described below Except that carbazole was used as the compound acting as precursor for synthesizing the epoxy resin, the same procedures as for the N,N-diglycidyl-4-phenoxy aniline was carried out under the same reaction conditions for glycidyl formation, producing N-glycidyl carbazole.

Epoxy Resin [B]
    ELM434 (tetraglycidyl diaminodiphenyl methane, supplied by Sumitomo Chemical Co., Ltd.)
    jER (registered trademark) 630 (triglycidyl-p-aminophenol, supplied by Japan Epoxy Resins Co., Ltd.)
    TETRAD-X (tetraglycidyl-m-xylene diamine, supplied by Mitsubishi Gas Chemical Co., Inc.)
    TG3DAS (tetraglycidyl-3,3'-diaminodiphenyl sulfone, supplied by Mitsui Fine Chemical, Inc.).

Bifunctional Epoxy Resin Other than [A] and [B]
    EPON (registered trademark) 825 (bisphenol A type epoxy resin, supplied by Japan Epoxy Resins Co., Ltd.))
    GOT (N-diglycidyl toluidine, supplied by Nippon Kayaku Co., Ltd.)
    GAN(N-diglycidyl aniline, supplied by Nippon Kayaku Co., Ltd.)
    Ex-146 (p-tert-butyl phenyl glycidyl ether, supplied by Nagase ChemteX Corporation).

<Curing Agent [C]>
Seikacure (registered trademark)-S (4,4'-diaminodiphenyl sulfone, supplied by Wakayama Seika Kogyo Co., Ltd.)
3,3'-DAS (3,3'-diaminodiphenyl sulfone, supplied by Mitsui Fine Chemical, Inc.).

<Thermoplastic Resin Particles [D]>
Toraypearl (registered trademark) TN (supplied by Toray Industries, Inc., average particle diameter of 13.0 μm)
Polyamide particles A (average particle diameter of 18.9 μm) prepared from Trogamid CX7323 (supplied by Daicel-Hüls Ltd.) through frost shattering and classification for particle size adjustment
Orgasol (registered trademark) 1002D (supplied by Atochem, average particle diameter of 21.0 μm).

<Thermoplastic Resin [E]>
Sumikaexcel (registered trademark) PES5003P (polyethersulfone, supplied by Sumitomo Chemical Co., Ltd.)
GAFONE (registered trademark) 3600RP (supplied by Solvay Advanced Polymers)

(1) Definition of 0° for Fiber Reinforced Composite Material

As described in JIS K7017 (1999), the fiber direction of a unidirectional fiber reinforced composite material is defined as its axis direction, the axis direction defined as 0°, and the direction perpendicular to the axis defined as 90°.

(2) Measurement of 0° Tensile Strength of Fiber Reinforced Composite Material

A unidirectional prepreg plate was cut to a predetermined size, and six of the resulting pieces were stacked unidirectionally, subjected to vacuum bagging, and cured in an autoclave at a temperature of 180° C. and a pressure of 6 kg/cm$^2$ for 2 hours to provide unidirectionally reinforced material (fiber reinforced composite material). This unidirectionally reinforced material was cut to a size of a width of 12.7 mm and a length of 230 mm, and a tab of glass fiber reinforced plastic with a width of 1.2 mm and a length of 50 mm was adhered to each end to provide a test piece. This test piece was subjected to 0° tensile test (measuring temperature −60° C.) using an Instron type universal tester according to JISK7073-1988.

(3) Measurement of Glass Transition Temperature

Using the same test piece as in paragraph (2), the glass transition temperature of the fiber reinforced composite material was measured by differential scanning calorimetry (DSC) according to JIS K7121 (1987). An 8 to 20 mg portion of the specimen (test piece) was put in a closed type sample container with a capacity of 50 μl, and heated from 30 to 350° C. at a heating rate of 10° C./min to measure its glass transition temperature. Here, a differential scanning calorimeter (DSC) supplied by TA Instruments was used for measurement. Specifically, in the stepwise changing portion of a resulting DSC curve, the glass transition temperature was defined as the temperature at the point where the straight line that is at the same distance in the vertical direction from the extensions of the baselines intersects the curve that changes stepwise due to glass transition.

(4) Measurement of Volatile Content in Prepreg

A prepreg was cut to prepare a 50×50 mm test piece. After weighing the test piece (W1), the prepreg test piece was placed on an aluminum plate and left quietly in a hot air dryer set at a temperature of 160° C. for 20 minutes. Then, the test piece was left to stand in a desiccator to cool down to 25° C. and weighed (W2). The volatile content (mass %) in the prepreg was calculated from the following equation.

$$PVC=(W1-W2)/W1\times 100$$

PVC: prepreg's volatile content (mass %)

$$\text{Volatile content(mass \%)}=PVC\times 100/RC$$

RC: resin content (mass %) in prepreg (5) Content of Particles Existing in the Depth Range from Prepreg Surface to 20% of its Thickness A prepreg plate was sandwiched and brought into close contact between two polytetrafluoroethylene resin plates with smooth surfaces and gradually heated to reach a temperature of 150° C. in 7 days for gelation and curing to prepare a cured resin plate. After the completion of curing, the sheet was cut in the direction vertical to the contact surfaces, and the cross section was polished and observed under an optical microscope at a magnification of 200 times or more to take a photograph containing both surfaces of the prepreg plate. By this operation, the distance between the polytetrafluoroethylene resin plates was measured at five positions at intervals in the horizontal direction in the photographed cross section, followed by calculating their average (n=5), which was assumed to be the thickness of the prepreg. For each surface of the prepreg, a line parallel to the surface of the prepreg was drawn at a depth equivalent to 20% of the total thickness. Then, the total area of the particles existing between each prepreg surface and the line draw above and the total area of the particles existing across the thickness of the prepreg plate were measured, followed by calculating the proportion of the particles existing within the depth range from the prepreg surface to 20% of the total thickness to those existing across the entire thickness. Here, the total area of fine particles was determined by cutting out particle regions from each photograph of the cross section and calculating their proportion from their weight.

(6) Measurement of Average Diameter of Thermoplastic Resin Particles

For the average diameter of the particles, the specimen was observed and photographed with a microscope, such as scanning electronic microscope, at a magnification of 1,000 or more, and the diameter of the circumcircle of randomly selected particles was measured, followed by calculating the average (n=50), which was assumed to represent the diameter of the particles.

(7) Measurement of Compression Strength after Impact of Carbon Fiber Reinforced Composite Material Unidirectional prepreg plates were stacked quasi-isotropically to prepare a 24-ply laminate of a [+45°/0°/−45°/90°]$_{3s}$ structure, and molded in an autoclave under the conditions of a temperature of 180° C., heating period of 2 hours, pressure of 6 kg/cm$^2$, and heating rate of 1.5° C./min to provide a quasi-isotropic laminate (fiber reinforced composite material). From this quasi-isotropic laminate, a test piece with a length of 150 mm and a width of 100 mm (thickness of 4.5 mm) was cut out, and a falling weight of 6.7 J/mm was applied to the center of the test piece according to SACMA SRM 2R-94 to determine the compression strength after impact.

Example 1

In kneading equipment, 20 parts by mass of N,N-diglycidyl-4-phenoxy aniline (epoxy resin [A]) and 80 parts by mass of ELM434 (epoxy resin [B]) were kneaded, and 50 parts by mass of Seikacure-S, used as the curing agent [C], was added and kneaded to prepare an epoxy resin composition for fiber reinforced composite materials. The components and contents are shown in Table 1 (figures in Table 1 are in parts by mass). The resulting epoxy resin composition was spread over release paper with a knife coater up to an areal weight of 50 g/m$^2$ to prepare a resin film. Two sheets of this resin film were used to sandwich unidirectionally pulled-and-paralleled carbon fibers (metsuke of 200 g/m$^2$), and the carbon fibers were impregnated with the epoxy resin composition by heating and pressing at a temperature of 100° C. and an air pressure of 1 atm between heating rollers to produce a prepreg. The volatile content in the resulting prepreg was measured according to the procedure in paragraph (4). For the resulting prepreg, furthermore, the procedures described in paragraphs (2) "Measurement of 0° tensile strength of fiber reinforced composite material," (3) Measurement of glass transition temperature," and (7) "Measurement of compression strength after impact of carbon fiber reinforced composite material" were carried out. Thus, a fiber reinforced composite material was produced and its 0° tensile strength, glass transition temperature, and compression strength after impact were measured.

Comparative Example 1

In kneading equipment, 100 parts by mass of N,N-diglycidyl-4-phenoxy aniline (epoxy resin [A]) and 50 parts by mass of Seikacure-S (curing agent [C]) were kneaded to prepare an epoxy resin composition for fiber reinforced composite materials. The components and contents are shown in Table 7 (figures in Table 7 are in parts by mass). The resulting epoxy resin composition was spread over release paper with a knife coater up to a metsuke of 50 g/m$^2$ to prepare a resin film. Two sheets of this resin film were used to sandwich unidirectionally pulled-and-paralleled carbon fibers (metsuke of 200 g/m$^2$), and the carbon fibers were impregnated with the epoxy resin composition by heating and pressing at a temperature of 100° C. and an air pressure of 1 atm between heating rollers to produce a prepreg. For the resulting prepreg, an attempt was made to produce a fiber reinforced composite material by carrying out the procedure described in paragraph (2) "Measurement of 0° tensile strength of fiber reinforced composite material," but the resulting fiber composite material suffered surface cracks.

Examples 2 to 20

Comparative Examples 2 to 7

Except for using the epoxy resins and curing agents in the amounts shown in Tables 1 to 3 and 7 to 8, the same procedure as in Example 1 was carried out to produce a prepreg. The volatile content in the resulting prepreg was measured according to the procedure in paragraph (4). For the resulting prepreg, furthermore, the procedures described in paragraphs (2) "Measurement of 0° tensile strength of fiber reinforced composite material," (3) Measurement of glass transition temperature," and (7) "Measurement of compression strength after impact of carbon fiber reinforced composite material" were carried out. Thus, a fiber reinforced composite material was produced and its 0° tensile strength, glass transition temperature, and compression strength after impact were measured. Results are shown in Tables 1 to 3 and 7 to 8.

Example 21

The epoxy resins in the amounts shown in Table 3 were combined with PES5003P and subsequently kneaded with Seikacure-S used as curing agent to prepare an epoxy resin composition for carbon fiber reinforced composite materials. The same procedure as in Example 1 was carried out to provide a prepreg.

Example 22

In kneading equipment, 40 parts by mass of N,N-diglycidyl-4-phenoxy aniline (epoxy resin [A]), 60 parts by mass of ELM434, and 12 parts by mass of Sumikaexcel (registered trademark) PES5003P (thermoplastic resin [E]) were kneaded and dissolved, and then 40 parts by mass of Seikacure-S (curing agent [C]) was added and kneaded to prepare a preliminary resin composition that does not contain thermoplastic resin particles [D]. The resulting preliminary resin composition was spread over release paper with a knife coater up to a metsuke of 30 g/m$^2$ to prepare a preliminary resin film. Two sheets of this preliminary resin film were used to sandwich unidirectionally pulled-and-paralleled carbon fibers (metsuke of 200 g/m$^2$), and the carbon fibers were impregnated with the epoxy resin composition for fiber reinforced composite materials by heating and pressing between heating rollers at 100° C. and 1 atm to produce a preliminary prepreg. Then, an appropriate amount of Toraypearl (registered trademark) TN (thermoplastic resin particles [D]) was added so that the final prepreg for fiber reinforced composite materials would contain the epoxy resin composition in a content as given in Table 3, thus providing a secondary epoxy resin composition, which was then spread over release paper with a knife coater up to a metsuke of 20 g/m$^2$ to prepare a secondary resin film. Two sheets of this secondary resin film were used to sandwich the preliminary prepreg, and the prepreg was impregnated with the epoxy resin composition for fiber reinforced composite materials by heating and pressing at 100° C. and 1 atm between heating rollers to produce an intended prepreg. The volatile content in the resulting prepreg was measured according to the procedure in paragraph (4). For the resulting prepreg, furthermore, the procedures described in paragraphs (2) "Measurement of 0° tensile strength of fiber reinforced composite material," (3) Measurement of glass transition temperature," and (7) "Measurement of compression strength after impact of carbon fiber reinforced composite material" were carried out. Thus, a fiber reinforced composite material was produced and its 0° tensile strength, glass transition temperature, and compression strength after impact were measured. Results are shown in Table 3.

Examples 23 to 56

Comparative Examples 8 to 10 and 11 to 12

Except for using the epoxy resins and curing agents in the amounts shown in Tables 3 to 8, the same procedure as in Example 22 was carried out to produce a prepreg. The volatile content in the resulting prepreg was measured according to the procedure in paragraph (4). For the resulting prepreg, furthermore, the procedures described in paragraphs (2) "Measurement of 0° tensile strength of fiber reinforced composite material," (3) Measurement of glass transition temperature," and (7) "Measurement of compression strength after impact of carbon fiber reinforced composite material" were carried out. Thus, a fiber reinforced composite material was produced and its 0° tensile strength, glass transition temperature, and compression strength after impact were measured. Results are shown in Tables 3 to 8.

TABLE 1

|  | Example 1 | Example 2 | Example 3 | Example 4 | Example 5 | Example 6 | Example 7 | Example 8 | Example 9 | Example 10 |
|---|---|---|---|---|---|---|---|---|---|---|
| Epoxy resin (Epoxy resin [A]) | | | | | | | | | | |
| N,N-diglycidyl-4-phenoxy aniline | 20 | 25 | 30 | 40 | 50 | 60 | | | | |
| N,N-diglycidyl-4-(4-nitro phenoxy) aniline | | | | | | | 25 | 50 | | |
| N,N-diglycidyl-4-(4-methyl phenoxy) aniline | | | | | | | | | 25 | 50 |
| N,N-diglycidyl-3-phenoxy aniline | | | | | | | | | | |
| Ex-731 | | | | | | | | | | |
| OPP-G | | | | | | | | | | |
| N-glycidyl carbazole (Epoxy resin [B]) | | | | | | | | | | |
| ELM434 | 80 | 75 | 70 | 60 | 50 | 40 | 75 | 50 | 75 | 50 |
| jER630 | | | | | | | | | | |
| TETRAD-X | | | | | | | | | | |
| TG3DAS | | | | | | | | | | |
| (Epoxy resin other than [A] and [B]) | | | | | | | | | | |
| EPON825 | | | | | | | | | | |
| GOT | | | | | | | | | | |
| GAN | | | | | | | | | | |
| Ex-146 | | | | | | | | | | |
| Thermoplastic resin particles [D] | | | | | | | | | | |
| Toraypearl TN | | | | | | | | | | |
| Polyamide particles A | | | | | | | | | | |
| Orgasol 1002D | | | | | | | | | | |
| Thermoplastic resin [E] | | | | | | | | | | |
| Sumikaexcel PES5003P | | | | | | | | | | |
| GAFONE3600P | | | | | | | | | | |
| Curing agent [C] | | | | | | | | | | |
| Seikacure-S | 50 | 50 | 50 | 45 | 45 | 45 | 50 | 45 | 50 | 45 |
| 3,3'-DAS | | | | | | | | | | |
| Evaluation | | | | | | | | | | |
| Glass transition temperature (°C.) | 207 | 200 | 193 | 180 | 168 | 157 | 201 | 166 | 201 | 165 |
| Volatile content (wt %) | 0.5 | 0.5 | 0.6 | 0.8 | 0.8 | 0.9 | 0.9 | 1.0 | 0.7 | 1.0 |
| Tensile strength (MPa) | 2650 | 2740 | 2850 | 2960 | 3020 | 2930 | 2740 | 2960 | 2710 | 2920 |
| Compression strength after impact (MPa) | 191 | 193 | 203 | 208 | 192 | 186 | 195 | 189 | 191.0 | 188 |
| Content of particles in 20% depth range | — | — | — | — | — | — | — | — | — | — |

TABLE 2

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Epoxy resin (Epoxy resin [A]) | | | | | | | | | | |
| N,N-diglycidyl-4-phenoxy aniline | 30 | 50 | 30 | 50 | 40 | 30 | 20 | 30 | 40 | 50 |
| N,N-diglycidyl-4-(4-nitro phenoxy) aniline | | | | | | | | | | |
| N,N-diglycidyl-4-(4-methyl phenoxy) aniline | | | | | | | | | | |
| N,N-diglycidyl-3-phenoxy aniline | | | | | | | | | | |
| Ex-731 | | | | | | | | | | |
| OPP-G | | | | | | | | | | |
| N-glycidyl carbazole (Epoxy resin [B]) | | | | | | | | | | |
| ELM434 | | | | | 50 | 50 | 50 | 70 | 60 | 50 |
| jER630 | 70 | 50 | | | | | | | | |
| TETRAD-X | | | 70 | 50 | | | | | | |
| TG3DAS | | | | | | | | | | |
| (Epoxy resin other than [A] and [B]) | | | | | | | | | | |
| EPON825 | | | | | 10 | 20 | 30 | | | |
| GOT | | | | | | | | | | |
| GAN | | | | | | | | | | |
| Ex-146 | | | | | | | | | | |
| Thermoplastic resin particles [D] | | | | | | | | | | |
| Toraypearl TN | | | | | | | | | | |
| Polyamide particles A | | | | | | | | | | |
| Orgasol 1002D | | | | | | | | | | |

TABLE 2-continued

|  | Example 11 | Example 12 | Example 13 | Example 14 | Example 15 | Example 16 | Example 17 | Example 18 | Example 19 | Example 20 |
|---|---|---|---|---|---|---|---|---|---|---|
| Thermoplastic resin [E] | | | | | | | | | | |
| Sumikaexcel PES5003P | | | | | | | | | | |
| GAFONE3600P | | | | | | | | | | |
| Curing agent [C] | | | | | | | | | | |
| Seikacure-S | 55 | 50 | 55 | 50 | 50 | 50 | 50 | | | |
| 3,3'-DAS | | | | | | | | 50 | 45 | 45 |
| Evaluation | | | | | | | | | | |
| Glass transition temperature (° C.) | 177 | 162 | 174 | 160 | 181 | 188 | 194 | 195 | 191 | 180 |
| Volatile content (wt %) | 1.0 | 1.6 | 1.1 | 1.1 | 0.6 | 0.5 | 0.5 | 0.6 | 0.7 | 1.3 |
| Tensile strength (MPa) | 2950 | 2920 | 2840 | 2890 | 3060 | 2950 | 2930 | 2750 | 2880 | 2950 |
| Compression strength after impact (MPa) | 169.0 | 149 | 173 | 152 | 186 | 195 | 183 | 208.0 | 207 | 196.0 |
| Content of particles in 20% depth range | — | — | — | — | — | — | — | — | — | — |

TABLE 3

|  | Example 21 | Example 22 | Example 23 | Example 24 | Example 25 | Example 26 | Example 27 | Example 28 | Example 29 | Example 30 |
|---|---|---|---|---|---|---|---|---|---|---|
| Epoxy resin | | | | | | | | | | |
| (Epoxy resin [A]) | | | | | | | | | | |
| N,N-diglycidyl-4-phenoxy aniline | 30 | 40 | 40 | 40 | 40 | 40 | 40 | 40 | 40 | 20 |
| N,N-diglycidyl-4-(4-nitro phenoxy) aniline | | | | | | | | | | |
| N,N-diglycidyl-4-(4-methyl phenoxy) aniline | | | | | | | | | | |
| N,N-diglycidyl-3-phenoxy aniline | | | | | | | | | | |
| Ex-731 | | | | | | | | | | |
| OPP-G | | | | | | | | | | |
| N-glycidyl carbazole | | | | | | | | | | |
| (Epoxy resin [B]) | | | | | | | | | | |
| ELM434 | 70 | 60 | 60 | 60 | 60 | 60 | 60 | 60 | | |
| jER630 | | | | | | | | | | |
| TETRAD-X | | | | | | | | | | |
| TG3DAS | | | | | | | | | 50 | 50 |
| (Epoxy resin other than [A] and [B]) | | | | | | | | | | |
| EPON825 | | | | | | | | | 10 | 30 |
| GOT | | | | | | | | | | |
| GAN | | | | | | | | | | |
| Ex-146 | | | | | | | | | | |
| Thermoplastic resin particles [D] | | | | | | | | | | |
| Toraypearl TN | | 20 | 20 | 20 | 20 | 20 | | | 20 | 20 |
| Polyamide particles A | | | | | | | 20 | | | |
| Orgasol 1002D | | | | | | | | 20 | | |
| Thermoplastic resin [E] | | | | | | | | | | |
| Sumikaexcel PES5003P | 16 | 12 | 10 | 16 | | | 12 | 12 | 12 | 12 |
| GAFONE3600P | | | | | 10 | 16 | | | | |
| Curing agent [C] | | | | | | | | | | |
| Seikacure-S | 45 | 45 | | | | | | | 50 | 50 |
| 3,3'-DAS | | | 45 | 45 | 45 | 45 | 45 | 45 | | |
| Evaluation | | | | | | | | | | |
| Glass transition temperature (° C.) | 195 | 195 | 191 | 190 | 190 | 189 | 189 | 191 | 183 | 194 |
| Volatile content (wt %) | 0.9 | 1.2 | 0.8 | 0.9 | 0.8 | 1.0 | 1.1 | 0.9 | 0.9 | 0.7 |
| Tensile strength (MPa) | 3160 | 3080 | 3060 | 3150 | 3010 | 3090 | 3070 | 3010 | 3220 | 3160 |
| Compression strength after impact (MPa) | 193 | 357 | 365 | 370 | 356 | 360 | 374 | 331 | 352 | 356 |
| Content of particles in 20% depth range | — | 98 | 98 | 97 | 97 | 97 | 97 | 98 | 98 | 97 |

TABLE 4

|  | Example 31 | Example 32 | Example 33 | Example 34 | Example 35 | Example 36 | Example 37 | Example 38 | Example 39 | Example 40 |
|---|---|---|---|---|---|---|---|---|---|---|
| Epoxy resin | | | | | | | | | | |
| (Epoxy resin [A]) | | | | | | | | | | |
| N,N-diglycidyl-4-phenoxy aniline | | | | | | | | | | |
| N,N-diglycidyl-4-(4-nitro phenoxy) aniline | | | | | | | | | | |

TABLE 4-continued

|  | Example 31 | Example 32 | Example 33 | Example 34 | Example 35 | Example 36 | Example 37 | Example 38 | Example 39 | Example 40 |
|---|---|---|---|---|---|---|---|---|---|---|
| N,N-diglycidyl-4-(4-methyl phenoxy) aniline |  |  |  |  |  |  |  |  |  |  |
| N,N-diglycidyl-3-phenoxy aniline |  |  |  |  |  |  |  |  |  |  |
| Ex-731 | 5 | 10 | 20 | 30 | 30 | 30 | 20 | 30 | 40 |  |
| OPP-G |  |  |  |  |  |  |  |  |  | 30 |
| N-glycidyl carbazole |  |  |  |  |  |  |  |  |  |  |
| (Epoxy resin [B]) |  |  |  |  |  |  |  |  |  |  |
| ELM434 | 60 | 60 | 60 | 60 | 50 | 40 | 80 | 70 | 60 | 70 |
| jER630 |  |  |  |  |  |  |  |  |  |  |
| TETRAD-X |  |  |  |  |  |  |  |  |  |  |
| TG3DAS |  |  |  |  |  |  |  |  |  |  |
| (Epoxy resin other than [A] and [B]) |  |  |  |  |  |  |  |  |  |  |
| EPON825 | 35 | 30 | 20 | 10 | 20 | 30 |  |  |  |  |
| GOT |  |  |  |  |  |  |  |  |  |  |
| GAN |  |  |  |  |  |  |  |  |  |  |
| Ex-146 |  |  |  |  |  |  |  |  |  |  |
| Thermoplastic resin particles [D] |  |  |  |  |  |  |  |  |  |  |
| Toraypearl TN | 20 | 20 | 20 | 20 | 20 | 20 | 20 | 20 | 20 | 20 |
| Polyamide particles A |  |  |  |  |  |  |  |  |  |  |
| Orgasol 1002D |  |  |  |  |  |  |  |  |  |  |
| Thermoplastic resin [E] |  |  |  |  |  |  |  |  |  |  |
| Sumikaexcel PES5003P |  |  |  |  |  |  |  |  |  |  |
| GAFONE3600P |  |  |  |  |  |  |  |  |  |  |
| Curing agent [C] |  |  |  |  |  |  |  |  |  |  |
| Seikacure-S | 40 | 40 | 40 | 44 | 44 | 44 | 33 | 33 | 30 | 40 |
| 3,3'-DAS |  |  |  |  |  |  |  |  |  |  |
| Evaluation |  |  |  |  |  |  |  |  |  |  |
| Glass transition temperature (° C.) | 198 | 191 | 181 | 183 | 176 | 168 | 184 | 182 | 169 | 172 |
| Volatile content (wt %) | 0.7 | 1.3 | 1.8 | 2.9 | 3.1 | 3.3 | 1.9 | 2.7 | 3.9 | 3.8 |
| Tensile strength (MPa) | 2740 | 2830 | 2920 | 2940 | 2960 | 2990 | 2760 | 2930 | 2980 | 3050 |
| Compression strength after impact (MPa) | 345.0 | 345 | 347 | 351 | 338 | 331 | 343 | 338 | 332 | 348 |
| Content of particles in 20% depth range | 98.0 | 98 | 97 | 97 | 97 | 97 | 98 | 98 | 97 | 98 |

TABLE 5

|  | Example 41 | Example 42 | Example 43 | Example 44 | Example 45 | Example 46 | Example 47 | Example 48 | Example 49 | Example 50 |
|---|---|---|---|---|---|---|---|---|---|---|
| Epoxy resin |  |  |  |  |  |  |  |  |  |  |
| (Epoxy resin [A]) |  |  |  |  |  |  |  |  |  |  |
| N,N-diglycidyl-4-phenoxy aniline |  |  |  |  |  |  |  |  |  |  |
| N,N-diglycidyl-4-(4-nitro phenoxy) aniline |  |  |  |  |  |  |  |  |  |  |
| N,N-diglycidyl-4-(4-methyl phenoxy) aniline |  |  |  |  |  |  |  |  |  |  |
| N,N-diglycidyl-3-phenoxy aniline |  |  |  |  |  |  |  |  |  |  |
| Ex-731 |  | 30 | 30 | 30 | 30 | 30 | 30 | 30 | 30 | 30 |
| OPP-G |  |  |  |  |  |  |  |  |  |  |
| N-glycidyl carbazole | 30 |  |  |  |  |  |  |  |  |  |
| (Epoxy resin [B]) |  |  |  |  |  |  |  |  |  |  |
| ELM434 | 70 |  |  | 70 | 70 | 70 | 70 | 70 | 70 | 70 |
| jER630 |  | 70 |  |  |  |  |  |  |  |  |
| TETRAD-X |  |  | 70 |  |  |  |  |  |  |  |
| TG3DAS |  |  |  |  |  |  |  |  |  |  |
| (Epoxy resin other than [A] and [B]) |  |  |  |  |  |  |  |  |  |  |
| EPON825 |  |  |  |  |  |  |  |  |  |  |
| GOT |  |  |  |  |  |  |  |  |  |  |
| GAN |  |  |  |  |  |  |  |  |  |  |
| Ex-146 |  |  |  |  |  |  |  |  |  |  |
| Thermoplastic resin particles [D] |  |  |  |  |  |  |  |  |  |  |
| Toraypearl TN | 20 | 20 | 20 | 20 | 20 | 20 | 10 | 30 |  |  |
| Polyamide particles A |  |  |  |  |  |  |  |  | 20 |  |
| Orgasol 1002D |  |  |  |  |  |  |  |  |  | 20 |
| Thermoplastic resin [E] |  |  |  |  |  |  |  |  |  |  |
| Sumikaexcel PES5003P |  |  |  | 10 | 20 | 30 | 10 | 10 | 10 | 10 |
| GAFONE3600P |  |  |  |  |  |  |  |  |  |  |

TABLE 5-continued

|  | Example 41 | Example 42 | Example 43 | Example 44 | Example 45 | Example 46 | Example 47 | Example 48 | Example 49 | Example 50 |
|---|---|---|---|---|---|---|---|---|---|---|
| Curing agent [C] | | | | | | | | | | |
| Seikacure-S | 40 | 45 | 45 | 40 | 40 | 40 | 40 | 40 | 40 | 40 |
| 3,3'-DAS | | | | | | | | | | |
| Evaluation | | | | | | | | | | |
| Glass transition temperature (° C.) | 193 | 176 | 175 | 184 | 184 | 185 | 184 | 181 | 181 | 182 |
| Volatile content (wt %) | 1.3 | 3.5 | 3.4 | 2.5 | 2.4 | 2.4 | 2.5 | 2.4 | 2.4 | 2.5 |
| Tensile strength (MPa) | 2990 | 2850 | 2860 | 3050 | 3150 | 3220 | 3040 | 3010 | 3040 | 3010 |
| Compression strength after impact (MPa) | 335 | 316 | 318 | 347 | 353 | 365 | 317 | 367 | 378 | 315 |
| Content of particles in 20% depth range | 97 | 97 | 97 | 97 | 98 | 98 | 97 | 98 | 98 | 97 |

TABLE 6

|  | Example 51 | Example 52 | Example 53 | Example 54 | Example 55 | Example 56 |
|---|---|---|---|---|---|---|
| Epoxy resin | | | | | | |
| (Epoxy resin [A]) | | | | | | |
| N,N-diglycidyl-4-phenoxy aniline | | | | | | |
| N,N-diglycidyl-4-(4-nitro phenoxy) aniline | | | | | | |
| N,N-diglycidyl-4-(4-methyl phenoxy) aniline | | | | | | |
| N,N-diglycidyl-3-phenoxy aniline | | | | | | |
| Ex-731 | 30 | 30 | 30 | 30 | 30 | 30 |
| OPP-G | | | | | | |
| N-glycidyl carbazole | | | | | | |
| (Epoxy resin [B]) | | | | | | |
| ELM434 | 70 | 70 | 70 | 70 | 70 | 70 |
| jER630 | | | | | | |
| TETRAD-X | | | | | | |
| TG3DAS | | | | | | |
| (Epoxy resin other than [A] and [B]) | | | | | | |
| EPON825 | | | | | | |
| GOT | | | | | | |
| GAN | | | | | | |
| Ex-146 | | | | | | |
| Thermoplastic resin particles [D] | | | | | | |
| Toraypearl TN | 20 | 20 | 20 | 20 | | |
| Polyamide particles A | | | | | 20 | |
| Orgasol 1002D | | | | | | 20 |
| Thermoplastic resin [E] | | | | | | |
| Sumikaexcel PES5003P | 10 | 30 | | | | |
| GAFONE3600P | | | 10 | 30 | 10 | 10 |
| Curing agent [C] | | | | | | |
| Seikacure-S | | | | | | |
| 3,3'-DAS | 40 | 40 | 40 | 40 | 40 | 40 |
| Evaluation | | | | | | |
| Glass transition temperature (° C.) | 180 | 181 | 178 | 179 | 176 | 176 |
| Volatile content (wt %) | 2.1 | 2.2 | 2.7 | 2.5 | 2.4 | 2.8 |
| Tensile strength (MPa) | 2890 | 3110 | 2920 | 2960 | 2970 | 2940 |
| Compression strength after impact (MPa) | 355 | 370 | 340 | 361 | 376 | 330 |
| Content of particles in 20% depth range | 97 | 98 | 97 | 98 | 97 | 97 |

TABLE 7

|  | Comparative example 1 | Comparative example 2 | Comparative example 3 | Comparative example 4 | Comparative example 5 | Comparative example 6 | Comparative example 7 |
|---|---|---|---|---|---|---|---|
| Epoxy resin | | | | | | | |
| (Epoxy resin [A]) | | | | | | | |
| N,N-diglycidyl-4-phenoxy aniline | | 100 | | | 30 | | |
| N,N-diglycidyl-4-(4-nitro phenoxy) aniline | | | | | | | |
| N,N-diglycidyl-4-(4-methyl phenoxy) aniline | | | | | | | |
| N,N-diglycidyl-3-phenoxy aniline | | | | | | | |

TABLE 7-continued

|  | Comparative example 1 | Comparative example 2 | Comparative example 3 | Comparative example 4 | Comparative example 5 | Comparative example 6 | Comparative example 7 |
|---|---|---|---|---|---|---|---|
| Ex-731 |  |  |  |  |  |  |  |
| OPP-G |  |  |  |  |  |  |  |
| N-glycidyl carbazole |  |  |  |  |  |  |  |
| (Epoxy resin [B]) |  |  |  |  |  |  |  |
| ELM434 |  | 100 | 70 |  |  |  |  |
| jER630 |  |  |  |  | 60 | 60 | 60 |
| TETRAD-X |  |  |  |  |  |  |  |
| TG3DAS |  |  |  |  |  |  |  |
| (Epoxy resin other than [A] and [B]) |  |  |  |  |  |  |  |
| EPON825 |  |  | 30 | 70 |  |  |  |
| GOT |  |  |  |  | 40 |  |  |
| GAN |  |  |  |  |  | 40 |  |
| Ex-146 |  |  |  |  |  |  | 40 |
| Thermoplastic resin particles [D] |  |  |  |  |  |  |  |
| Toraypearl TN |  |  |  |  |  |  |  |
| Polyamide particles A |  |  |  |  |  |  |  |
| Orgasol 1002D |  |  |  |  |  |  |  |
| Thermoplastic resin [E] |  |  |  |  |  |  |  |
| Sumikaexcel PES5003P |  |  |  |  |  |  |  |
| GAFONE3600P |  |  |  |  |  |  |  |
| Curing agent [C] |  |  |  |  |  |  |  |
| Seikacure-S | 50 | 50 | 45 | 35 | 55 | 55 | 60 |
| 3,3'-DAS |  |  |  |  |  |  |  |
| Evaluation |  |  |  |  |  |  |  |
| Glass transition temperature (° C.) | — | 271 | 210 | 145 | 172 | 178 | 161 |
| Volatile content (wt %) | — | 0.4 | 0.4 | 0.8 | 5.2 | 5.9 | 6.8 |
| Tensile strength (MPa) | — | 2060 | 2320 | 2810 | 2830 | 2740 | 2810 |
| Compression strength after impact (MPa) | — | 190 | 172 | 152 | 173 | 165 | 162 |
| Content of particles in 20% depth range | — | — | — | — | — | — | — |

TABLE 8

|  | Comparative example 8 | Comparative example 9 | Comparative example 10 | Comparative example 11 | Comparative example 12 |
|---|---|---|---|---|---|
| Epoxy resin |  |  |  |  |  |
| (Epoxy resin [A]) |  |  |  |  |  |
| N,N-diglycidyl-4-phenoxy aniline |  |  |  |  |  |
| N,N-diglycidyl-4-(4-nitro phenoxy) aniline |  |  |  |  |  |
| N,N-diglycidyl-4-(4-methyl phenoxy) aniline |  |  |  |  |  |
| N,N-diglycidyl-3-phenoxy aniline |  |  |  |  |  |
| Ex-731 |  | 2 | 2 | 30 | 10 |
| OPP-G |  |  |  |  |  |
| N-glycidyl carbazole |  |  |  |  |  |
| (Epoxy resin [B]) |  |  |  |  |  |
| ELM434 | 100 | 98 | 60 | 30 | 90 |
| jER630 |  |  |  |  |  |
| TETRAD-X |  |  |  |  |  |
| TG3DAS |  |  |  |  |  |
| (Epoxy resin other than [A] and [B]) |  |  |  |  |  |
| EPON825 |  |  | 38 | 40 |  |
| GOT |  |  |  |  |  |
| GAN |  |  |  |  |  |
| Ex-146 |  |  |  |  |  |
| Thermoplastic resin particles [D] |  |  |  |  |  |
| Toraypearl TN | 20 | 20 | 20 | 20 | 20 |
| Polyamide particles A |  |  |  |  |  |
| Orgasol 1002D |  |  |  |  |  |
| Thermoplastic resin [E] |  |  |  |  |  |
| Sumikaexcel PES5003P |  |  |  |  |  |
| GAFONE3600P |  |  |  |  |  |

TABLE 8-continued

| | Comparative example 8 | Comparative example 9 | Comparative example 10 | Comparative example 11 | Comparative example 12 |
|---|---|---|---|---|---|
| Curing agent [C] | | | | | |
| Seikacure-S | 45 | 40 | 40 | 34 | 45 |
| 3,3'-DAS | | | | | |
| Evaluation | | | | | |
| Glass transition temperature (° C.) | 268 | 258 | 195 | 158 | 232 |
| Volatile content (wt %) | 0.4 | 0.5 | 0.5 | 3.2 | 0.6 |
| Tensile strength (MPa) | 2180 | 2240 | 2320 | 2680 | 2450 |
| Compression strength after impact (MPa) | 367 | 364 | 353 | 309 | 361 |
| Content of particles in 20% depth range | 98.0 | 98 | 97 | 97 | 97 |

Comparison of Examples 1 to 56 with Comparative example 1 to 12 shows that prepreg plates produced from the epoxy resin composition of the invention are low in volatile content, and fiber reinforced composite materials produced from the epoxy resin composition of the invention has high heat resistance and good strength characteristics at low temperatures.

Comparison of Examples 3 and 4 with Comparative examples 3 to 6 suggests that the present invention serves to achieve a specifically low volatile content and good strength characteristics at low temperatures.

Examples 21 to 56 further show that a high compression strength after impact can be achieved in addition to good strength characteristics at low temperatures, indicating that both high impact resistance and good mechanical characteristics at low temperatures are achieved simultaneously.

INDUSTRIAL APPLICABILITY

The invention serves to provide an epoxy resin composition with a low volatile content that produces a highly heat resistant material when cured. Furthermore, fiber reinforced composite materials produced from the epoxy resin composition maintain a high mechanical strength in a severe operating environment, such as at a low temperature, and serve effectively as structural members. For instance, they have been preferred in the aerospace industry as material for primary structural members for aircraft such as main wing, tail assembly, and floor beam and for secondary structural members such as flap, aileron, cowl, fairing, and other interior members, as well as for structural members for artificial satellites such as rocket motor case. With respect to general industrial uses, they are useful as material for structural members, drive shaft, leaf spring, windmill blade, pressure vessel, and flywheel of vehicles such as automobiles, ships and railroad vehicles; as well as papermaking rollers and materials for civil engineering and construction such as roofing material, cable, reinforce bar, and mending and reinforcing material. They are also used preferably for sports goods such as golf club shaft, fishing rod, tennis racket, badminton racket, squash racket, hockey stick, and ski pole.

The invention claimed is:

1. An epoxy resin composition for fiber reinforced composite materials comprising:

[A]: an epoxy resin having a structure as represented by general formula (1):

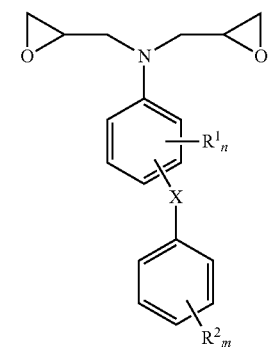

(1)

where each $R^1$ and $R^2$ independently denotes one selected from the group consisting of an aliphatic hydrocarbon group with a carbon number of 1 to 4, an alicyclic hydrocarbon group with a carbon number of 3 to 6, an aromatic hydrocarbon group with a carbon number of 6 to 10, a halogen atom, an acyl group, a trifluoromethyl group, and a nitro group; n represents an integer of 0 to 4; m represents an integer of 0 to 5; and X is one selected from the group consisting of —O—, —S—, —CO—, —C(=O)O—, and —SO$_2$—;

[B] a tri or more-functional epoxy resin having three or more epoxy groups per molecule;

an optional epoxy resin other than [A] and [B]; and

[C] a curing agent;

wherein [A] accounts for 5 to 60 mas % of all epoxy resin present in the composition; and wherein [B] accounts for 40 to 80 mass % of all epoxy resin present in the composition.

2. The epoxy resin composition of claim 1 wherein [A] accounts for 25 to 60% mass of all epoxy resin present in the composition.

3. The epoxy resin composition of claim 1 wherein X of general formula (1) is —O—.

4. The epoxy resin composition of claim 1 or 3 wherein [A] accounts for 30 to 50 mass % of all epoxy resin present in the composition.

5. The epoxy resin composition of claim 1 wherein n=0 and m=0 in general formula (1).

6. The epoxy resin composition of claim 1 wherein [C] is an aromatic amine.

7. The epoxy resin composition of claim 1 further comprising thermoplastic resin particles [D].

8. The epoxy resin composition of claim 1 further comprising a thermoplastic resin [E] that can dissolve in [A] or [B].

9. A prepreg comprising reinforcement fiber impregnated with the epoxy resin composition of claim 1.

10. The prepreg of claim 9 wherein said reinforcement fiber is carbon fiber.

11. A fiber reinforced composite material produced by curing the prepreg of claim 10.

12. A cured resin produced by curing the epoxy resin composition of claim 1.

13. A carbon fiber reinforced composite material comprising a carbon reinforcement fiber and the cured resin of claim 12.

* * * * *